US008505532B2

(12) United States Patent
Nakamura

(10) Patent No.: US 8,505,532 B2
(45) **Date of Patent: *Aug. 13, 2013**

(54) CARBON DIOXIDE MIST PRESSURE BATH SYSTEM

(75) Inventor: Shoichi Nakamura, Higashichikuma-gun (JP)

(73) Assignees: ACP Japan Co., Ltd., Tokyo (JP); Shoichi Nakamura, Higashichikuma-gun (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/735,501

(22) PCT Filed: Jun. 19, 2009

(86) PCT No.: PCT/JP2009/061166

§ 371 (c)(1), (2), (4) Date: Jul. 22, 2010

(87) PCT Pub. No.: WO2010/073755

PCT Pub. Date: Jul. 1, 2010

(65) Prior Publication Data

US 2010/0292659 A1 Nov. 18, 2010

(30) Foreign Application Priority Data

Dec. 26, 2008 (JP) ................................ 2008-334792

(51) Int. Cl.

*A61G 10/00* (2006.01)
*A61H 33/14* (2006.01)
*A01N 59/04* (2006.01)

(52) U.S. Cl.

USPC ............ 128/202.12; 128/202.26; 128/202.27; 424/699; 424/670; 601/151; 607/80; 607/81; 607/83; 607/84

(58) Field of Classification Search

USPC .................... 128/202.12; 424/699, 700, 621; 422/33; 604/23, 24; 607/80, 81, 83, 84, 607/86, 91; 601/151

See application file for complete search history.

(56) References Cited

U.S. PATENT DOCUMENTS 3,593,710 A * 7/1971 Eichelman et al. ...... 128/200.11
3,908,704 A * 9/1975 Clement et al. ............... 138/121

(Continued)

FOREIGN PATENT DOCUMENTS

JP S61-217132 9/1986
JP H07-171189 7/1995

(Continued)

OTHER PUBLICATIONS

JPO Machine Translation of JP 07-171189 A, Nishino et al., Jul. 11, 1995, Blood Circulation Promoting Device, all pages.*

(Continued)

*Primary Examiner* — Clinton T Ostrup
(74) *Attorney, Agent, or Firm* — Manabu Kanesaka

(57) ABSTRACT

The invention to provide a carbon dioxide mist pressure bath system which is possible to cause the carbon dioxide mist to be absorbed efficiently through the skin and mucous membrane of the human living-body. The system comprises a carbon dioxide supply means 11; a liquid supply means 21; a carbon dioxide mist generating means 31 for pulverizing and dissolving carbon dioxide and the liquid to generate the carbon dioxide mist; a living-body cover member 41 for covering the skin and mucous membrane of the living-body and formed with a space of sealing inside the carbon dioxide mist generated by the carbon dioxide mist generating means 31; a liquid circulation means 61 for again supplying a liquid collected in the carbon dioxide mist generating means 31 into the carbon dioxide mist generating means; and a pressurization means 81 for pressurizing the inside of the living-body cover member 41.

19 Claims, 6 Drawing Sheets

(56) References Cited

U.S. PATENT DOCUMENTS

| | | | | |
|---|---|---|---|---|
| 3,936,698 | A * | 2/1976 | Meyer | 361/231 |
| 5,667,769 | A * | 9/1997 | Kuckens et al. | 424/70.1 |
| 5,984,868 | A * | 11/1999 | Shih et al. | 600/300 |
| 7,122,018 | B2 * | 10/2006 | Stenzler et al. | 604/23 |
| 2002/0040205 | A1 * | 4/2002 | Rasor et al. | 604/23 |
| 2010/0168650 | A1 * | 7/2010 | Nakamura | 604/24 |
| 2010/0179470 | A1 * | 7/2010 | Nakamura | 604/23 |
| 2010/0298786 | A1 * | 11/2010 | Nakamura | 604/289 |
| 2011/0220101 | A1 * | 9/2011 | Nakamura | 128/200.14 |

FOREIGN PATENT DOCUMENTS

| | | |
|---|---|---|
| JP | 2005-205163 | 8/2005 |
| JP | 2006-026022 | 2/2006 |
| JP | 2006263253 A * | 10/2006 |
| JP | 2007-014482 | 1/2007 |
| JP | 2007-181720 | 7/2007 |
| JP | U 3144717 | 8/2008 |

OTHER PUBLICATIONS

JPO Machine Translation of JP 2006-263253 A, Uchida et al, Oct. 5, 2006, Blood Circulation Promoting Apparatus, all pages.*

JPO Machine Translation of JP 2007-1817200 A Niisato et a l, Jul. 19, 2007, Carbon Dioxide Treatment Devcie, all pages.*

* cited by examiner

CARBON DIOXIDE MIST PRESSURE BATH SYSTEM

RELATED APPLICATIONS

The present application is National Phase of International Application No. PCT/JP2009/061166 filed Jun. 19, 2009, and claims priority from, Japanese Application No. 2008-334792 filed Dec. 26, 2008, the disclosure of which is hereby incorporated by reference herein in its entirety.

TECHNICAL FIELD

The present invention relates a carbon dioxide mist pressure bath system, in which a carbon dioxide mist is contacted to a skin and mucous membrane of a human living-body at pressure of not less than a predetermined value, whereby carbon dioxide is absorbed into the skin and mucous membrane at high efficiency.

BACKGROUND ART

It has conventionally been known that carbon dioxide (carbonic acid anhydride: $CO_2$, called as "carbon dioxide" hereafter) has both properties of being not only soluble in water (water-soluble) but also soluble in fat (fat-soluble) and if, therefore, only contacting the skin or mucous membrane of the living-body being as mixed with water and fat, carbon dioxide penetrates under a subcutaneous layer and expands blood vessels around penetrated carbon dioxide, and it works to improve a blood circulation. Owing to this action of accelerating the blood circulation, it displays various physiological effects such as dropping of blood pressure, improving of metabolism or accelerating to remove pain substance or waste product. Further, it has also anti-inflammation and anti-bacterial. Therefore, carbon dioxide has recently been given attention also from viewpoints of improving health or beauty other than the purpose of medical cares.

Carbon dioxide in the tissue of the living-body works to release oxygen carried in combination with hemoglobin in a red blood cell. Around parts at a high density of carbon dioxide, the red blood cell releases more oxygen. Thus, supply of oxygen to cells by the red blood cell is mainly controlled by carbon dioxide. In short, being without carbon dioxide, hemoglobin remains as combined with oxygen and the cell becomes unable to receive oxygen. As is seen, carbon dioxide is seen as a waste product resulted from action of oxygen, however, it plays in fact very important roles in the human living-body.

Thus, as a prior art for causing carbon dioxide to be absorbed into the living body, a most broadly used technique is (1) a bathing agent issuing carbon dioxide in water. Throwing this bathing agent into hot water in a bathtub, it generates carbon dioxide by reacting acid and carbonate contained in the bathing agent, and dissolves in hot water. Carbon dioxide dissolved in hot water contacts the skin of a bathing person and penetrates subcutaneous layer to display physiological effects as above mentioned.

Further, as the prior art for causing more carbon dioxide to contact the living body, (2) a carbon dioxide bathing device is known. This emits and disperses carbon dioxide in hot water and dissolves it at high density. When bathing in hot water dissolving carbon dioxide, the skin directly contacts it like the bathing agent.

A blood circulation accelerating device (for example, Patent Document 1) has now been disclosed, which (3) attaches a cover to a human living body on its one part to form a sealed space together with the surface of the human living body, and introduces carbon dioxide into the sealed space from a carbon dioxide supply means for carrying out a carbon dioxide bath.

Inventors of the present invention have proposed a carbon dioxide pressure bath device which is equipped with at least (4) the carbon dioxide supply means, a pressure means, and a covering material for covering the skin of the living body and causing carbon dioxide to contact the skin of the living body at pressure of not less than predetermined value.

CITATION LIST

Patent Document

Patent Document 1: Japanese Laid-Open Patent Publication No. 07-171189

SUMMARY OF INVENTION

Problems to be Solved by the Invention

However, each of the above prior arts (1) and (2) dissolves carbon dioxide in hot water when taking the bath, and causes carbon dioxide to be absorbed into the skin of the living body. Accordingly, they were involved with difficult points of using only when taking the bath. In addition, since carbon dioxide is easily dissolved in water, and even if much consuming it, an absorption rate is not high.

On the other hand, the above prior arts (3) and (4) cause carbon dioxide to directly contact the living body, and comparing with the prior arts (1) and (2), effects are high and efficiency is good. But there has not yet been furnished a concrete structure for improving the density of carbon dioxide contained in the carbon dioxide mist.

In view of the above mentioned problems, it is an object of the invention to provide a carbon dioxide mist pressure bath system which is possible to cause the carbon dioxide mist to be absorbed efficiently through the skin and mucous membrane of the human living-body.

Means for Solving the Problem

For solving the above mentioned problems, the present invention is to provide a carbon dioxide mist pressure bath system which causes a mist (called as "carbon dioxide mist" hereafter) to contact the skin and mucous membrane of the living-body, this mist being prepared by pulverizing and dissolving carbon dioxide and a liquid at a density of not less than a predetermined value, comprising a carbon dioxide supply means; a liquid supply means; a carbon dioxide mist generating means for generating the carbon dioxide mist by pulverizing and dissolving carbon dioxide and the liquid; a living-body cover member for covering the skin and mucous membrane of the living-body, and formed with a space of sealing inside the carbon dioxide mist generated by the carbon dioxide mist generating means; a liquid circulation means for again supplying the liquid collected in the carbon dioxide mist generating means into the same carbon dioxide mist generating means; and a pressurization means for pressurizing the inside of the living-body cover member, and characterized in that the carbon dioxide mist in the living body cover member is caused to contact the skin and mucous membrane of the living-body at pressure of not less than a predetermined value.

By the way, the invention refers it as "pulverizing and dissolving" to pulverize the liquid into fine liquid drops, and cause to contact with the gas (carbon dioxide).

Herein, desirably, the above mentioned carbon dioxide mist pressure bath system is further provided with a sensor for measuring the supplying conditions of carbon dioxide, liquid and carbon dioxide mist, as well as a control means for controlling supplies of carbon dioxide and liquid, and generation and supply of carbon dioxide mist, based on the measuring values of the sensor.

In addition, there is preferably provided a liquid pressurizing means for supplying under pressure the liquid circulating by means of the liquid circulation means into the carbon dioxide mist generating means.

Further, the pressurization means for pressurizing the inside of the living-body cover member desirably carries out an interval pressurization (pulse pressurization).

Still further, there may be provided an electric charge supply means for supplying a charge to the mist from the carbon dioxide mist supply means. At this time, the charge is preferably a minus charge.

In regard to the above mentioned liquid, suitable are water, ionic water, physiological salt solution, anti-allergic agent, anti-inflammatory agent, anti-febrile, anti-fungus agent, or anti-influenza virus. Otherwise, the above liquid is water containing one or plural medicines of menthol, vitamin E, vitamin C derivative, retinol, anesthetic, cyclodextrin, complex of photocatalyst and apatite, hyaluronic acid, coenzyme Q10, seed oil, propolith, or high density carbonate spring, ionic water, physiological salt solution, anti-allergic agent, anti-inflammatory agent, anti-febrile, anti-fungus agent, or anti-influenza virus.

Preferably, the liquid is supplied into the carbon dioxide mist generating means under a condition of being heated.

Grain sizes of the carbon dioxide mist supplied from the carbon dioxide mist generating means to the living-body cover member are suitably not more than 10 μm.

The control means preferably holds pressure at 1.02 to 2.5 air pressure in the living-body cover member when taking the carbon dioxide mist bath.

Desirably, the carbon dioxide mist generating means has the pressurization means for pressurizing the inside of the living-body cover member and a mist supply pipe for supplying the carbon dioxide mist into the living-body cover member, and this mist supply pipe has a filter for removing liquid drops attached to an inside of the pipe.

The carbon dioxide mist generating means has a mist supply pipe for supplying the carbon dioxide mist into the pressurization means for pressurizing the inside of the living-body cover member and the living-body cover member, and a whole or a part of this mist supply pipe is composed with a cornice shape.

The carbon dioxide mist generating means has a mist supply pipe for supplying the carbon dioxide mist into the living-body cover member, and this mist supply pipe is provided with the check valve. Further, the supply mouth of the carbon dioxide mist of the living-body cover member and the pressurization means for pressurizing the inside of the living-body cover member is also provided with the check valve.

It is suitable that the carbon dioxide mist generating means has a tank for collecting the liquid and the carbon dioxide mist, and the tank has inside one or plurality of pored plates for refining the carbon dioxide mist.

When the pressure value within the living-body cover member comes over a predetermined value, the supply of carbon dioxide from the carbon dioxide supply means is stopped.

Advantageous Effect of the Invention

According to the carbon dioxide mist pressure bath system, the density of the carbon dioxide contained in the carbon dioxide mist is increased by a simple structure, and a pass-skin absorption of carbon dioxide into the living-body can be accelerated more efficiently.

DESCRIPTION OF EMBODIMENTS

In the following description, explanations will be made to embodiments of this invention, referring to the attached drawings.

First Embodiment

Figure 1:
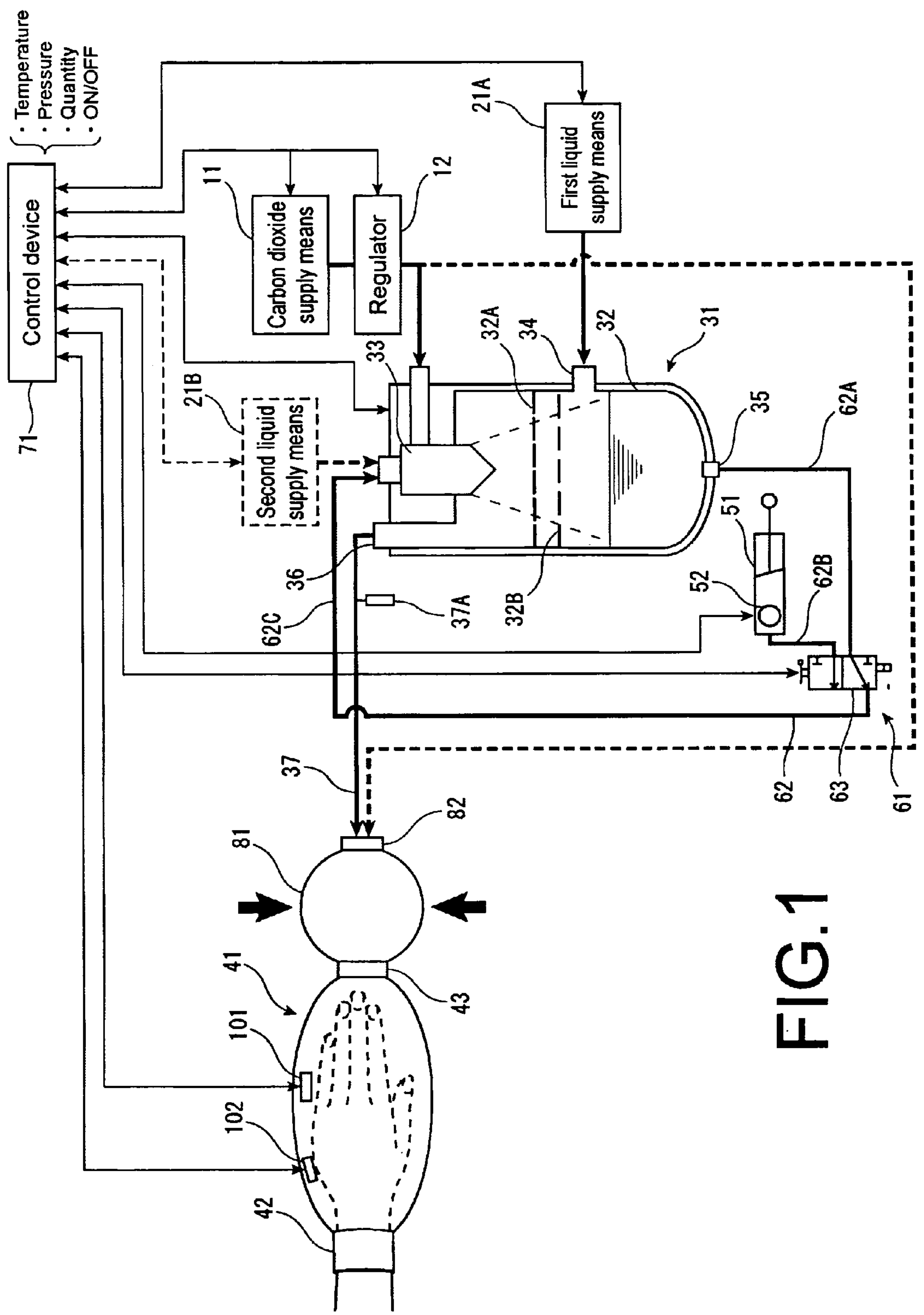
FIG. 1 A generally schematic view of the carbon dioxide mist pressure bath system depending on a first embodiment of the invention.

FIG. 1 is the generally schematic view of the carbon dioxide mist pressure bath system depending on a first embodiment of the invention. As shown in this view, the carbon dioxide mist pressure bath system of this embodiment comprises the carbon dioxide supply means 11; the liquid supply means 21; the carbon dioxide mist generating means 31 for pulverizing and dissolving carbon dioxide and the liquid to generate the mist; the living-body cover member 41 formed with a space for sealing inside the supplied carbon dioxide mist; a liquid pressurizer 51 for again supplying under pressure a liquid collected in the carbon dioxide mist generating means 31 into the same carbon dioxide mist generating means 31; the liquid circulation means 61 for circulating the liquid; a control device 71 for controlling to generate and supply the carbon dioxide mist; and a pressure portion (gas storage) 81 for pressurizing the inside of the living-body cover member 41.

The carbon dioxide supply means 11 supplies carbon dioxide to the carbon dioxide mist generating device 31, provided that if the carbon dioxide mist is enough supplied in the living-body pressure bath cover 41, only carbon dioxide is directly supplied into the living-body pressure bath cover 41 from the carbon dioxide supply means 11. As the carbon dioxide supply means 11, to use a carbon dioxide bomb is optimum. The carbon dioxide supply means 11 is provided with a regulator 12 for adjusting pressure of carbon dioxide. The carbon dioxide supply means 11 may be disposed with a heater (not shown) for heating carbon dioxide or a thermometer (not shown) for controlling temperatures.

The liquid supply means 21 is composed of such as a pump and supplies the liquid to the carbon dioxide mist generating device 31. As the liquid, other than water, ionic water, or physiological salt solution, it is suitable to use effective medicines to the user's diseases or symptoms such as anti-allergic agent, anti-inflammatory agent, anti-febrile, anti-fungus agent, anti-influenza virus. Further, these liquids are further possible to generate synergistic effects by coupling with a carbon dioxide physiological action with single or plurality of menthol having a cooling action; vitamin E accelerating circulation of the blood; vitamin C derivative easily to be absorbed to a skin tissue and having a skin beautifying effect; retinol normalizing a skin heratinizing action and protecting the mucous membrane; anesthetic moderating irritation to the mucous membrane; cyclodextrin removing odor; photocatalysis or a complex of photocatalysis and apatite having disinfection and anti-phlogistic; hyaluronic acid having excellent water holding capacity and a skin moisture retention effect; coenzyme Q10 activating cells and heightening immunization; a seed oil containing anti-oxidation and much nutrient; or propolith having anti-oxidation, anti-fungus, anti-inflammatory agent, pain-killing, anesthetic, and immunity. In addition, high density carbonate spring may be added (as examples organic components, sulfate, carbonate, sodium dichloroisocyanurate) having main components of carbonate and organic acid.

Further, as shown in FIG. 1, plural liquid supply means 21 (herein, a first liquid supply means 21A, and a second liquid supply means 21B) may be arranged. Further, the plural liquid supply means 21A, 21B may be for respectively different liquids. The liquid supply means 21 supplies the liquid from the liquid supply mouth 34 of the carbon dioxide mist generating device 31 as the first liquid supply means 21A of FIG. 1, provided that if providing plural liquid supply means 21, the liquid is supplied into the liquid nozzle 33 of the carbon dioxide mist generating device 31, as the second liquid supply means 21B of FIG. 1.

The liquid supply means 21 is desirably furnished with a heater (not shown) heating the liquid (for example, heating to hot water of around 40° C.) or a thermometer (not shown).

The carbon dioxide mist generating device 31 is for supplying the liquid and carbon dioxide into the living-body pressure bath cover 41 under a condition of the pulverized and dissolved mist, the liquid being supplied from the liquid supply means 21 and from the liquid pressurizer 51, and said carbon dioxide being supplied from the carbon dioxide supply means 11. The carbon dioxide mist generating device 31 has a tank 32 for storing the liquid, carbon dioxide and the carbon dioxide mist, a fluid nozzle 33 for generating the carbon dioxide mist, a liquid supply mouth 34 for storing the liquid supplied from a first liquid supply means 21A into the tank 32, a liquid exhaust mouth 35 for sending the liquid collecting in the tank 32 to the liquid circulation path 62, and a carbon dioxide mist exhaust mouth 36 for exhausting the carbon dioxide mist in the tank 32.

The liquid nozzle 32 (herein, as the example, two-liquid nozzle or three-liquid nozzle) uses high speed flow of carbon dioxide supplied from the carbon dioxide supply means 11 to pulverize and dissolve the liquid to generates the carbon dioxide mist. Then, the liquid drop pulverized by the fluid nozzle 33 electrically charges to minus by a Lenard effect and can display a minus ion effect.

The tank 32 is filled with the liquid supplied from the first liquid supply means 21A through the liquid supply mouth 34 and with the carbon dioxide mist generated in the fluid nozzle 33. The filled carbon dioxide mist is supplied into the pressure portion 81 and the living-body pressure bath cover 41 from the carbon dioxide mist exhaust mouth 36 through the carbon dioxide mist supply pipe 37, and one part thereof is dissolved into the liquid collecting in the tank 32. Therefore, the liquid stored in the tank 32 gradually heightens the density of dissolved carbon dioxide. This liquid is further circulated by a liquid circulation means 61 and introduced into the fluid nozzle 33 to turn out the pulverized and dissolved mist. The mist generated then more dissolves carbon dioxide. By repeating circulation of the liquid, it is possible to generate the mist dissolving carbon dioxide of the high density.

Figure 2A:
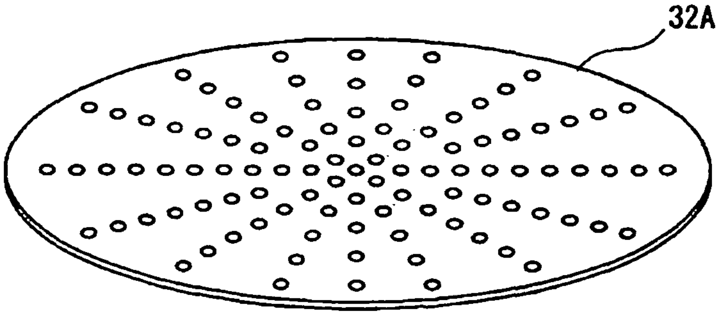
FIG. 2 Typical views showing examples of the plates arranged within the carbon dioxide mist generating device of the carbon dioxide mist pressure bath system depending on the invention.
Figure 2B:
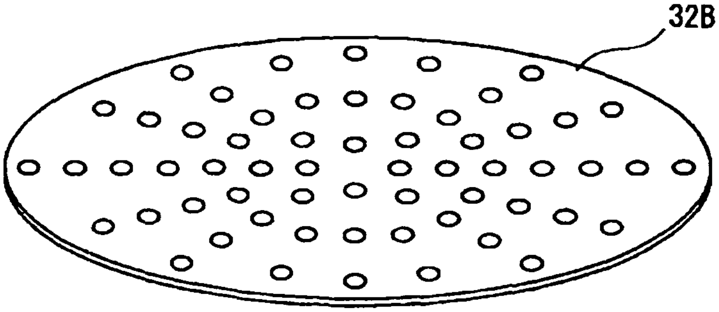

Inside of the tank 32, one sheet or plural sheets (in FIG. 3, as the example, two sheets) of the plates 32A, 32B may be provided above the surface of the stored liquid. FIG. 2 shows examples of the plates 32A, 32B. As seeing, the plates 32A, 32B are formed with small pores, and the generated gas mist is further refined by passing through the pores. Then, with respect to the plate 32A nearer to the fluid nozzle 33 and the plate 32B farther from it, the diameters of the nearer plate 32B are made preferably smaller.

The liquid circulation means 61 is composed of the liquid pressurizer 51 from the liquid exhaust mouth 35 of the carbon dioxide mist generating device 31 and the liquid circulation path 62 connected to the fluid nozzle 33. The liquid circulation path 62 is provided with a valve 63 to enable to switch to any of a path connecting the liquid exhaust mouth 35 and the fluid nozzle 33, a path connecting the liquid exhaust mouth 35 and the liquid pressurizer 51, and a path connecting the liquid pressurizer 51 and the fluid nozzle 33. In addition, a simultaneous switch to connect the liquid exhaust mouth 35 and the fluid nozzle 33 as well as the liquid exhaust mouth 35 and the liquid pressurizer 51 may be available. When circulating the liquid in the tank 32 into the fluid nozzle 33, the liquid passes in succession from the liquid exhaust mouth 35 to the first liquid pipe 62A, the valve 63 and a third liquid pipe 62C, and reaches the fluid nozzle 33. For filling the liquid in the tank 32 into the liquid pressurizer 51, the liquid passes in succession from the liquid exhaust mouth 35 to the first liquid pipe 62A, the valve 63 and the second liquid pipe 62B, and reaches the liquid pressurizer 51. For sending the liquid filled in the liquid pressurizer 51 to the fluid nozzle 33, the liquid passes in succession from the liquid pressurizer 51 to the second liquid pipe 62B, the valve 63 and the third liquid pipe 62C, and reaches the fluid nozzle 33.

Figure 3:
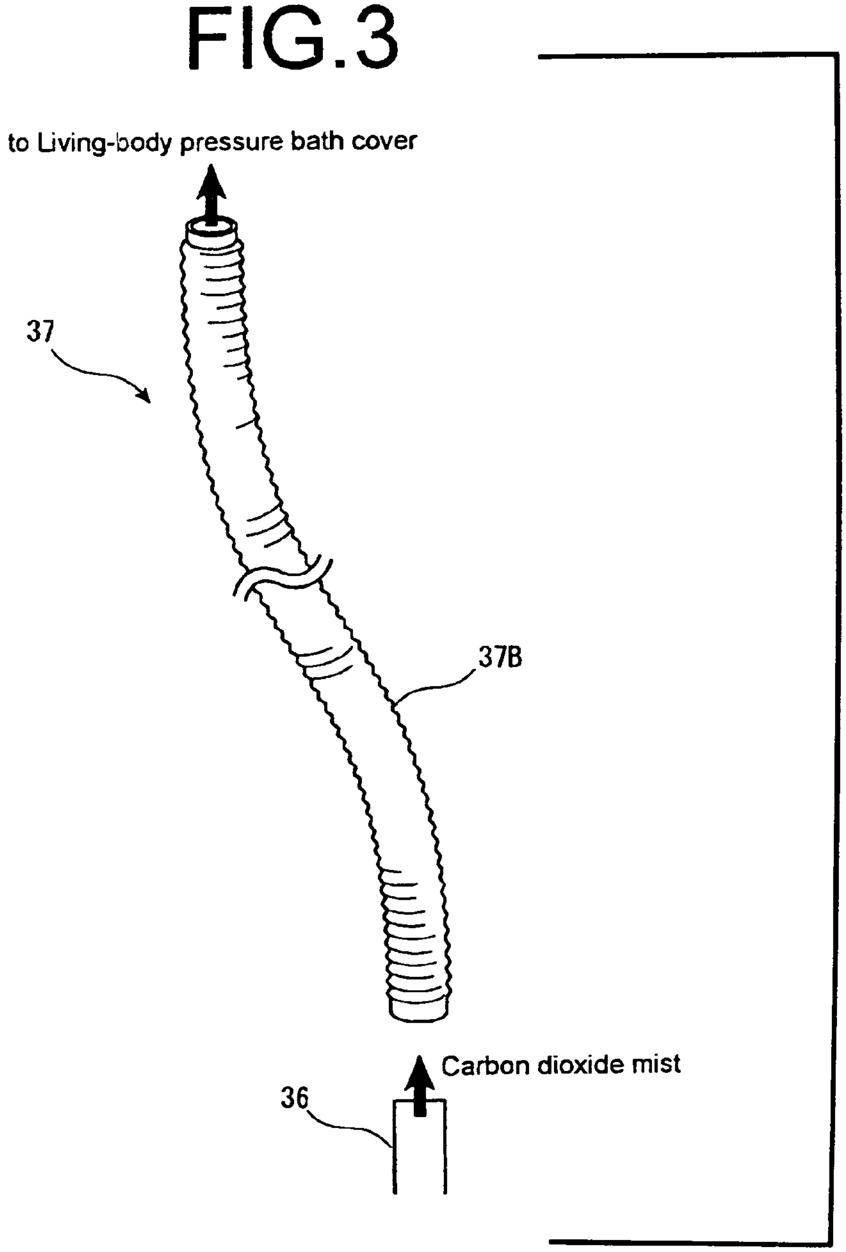
FIG. 3 A typical view showing one example of the carbon dioxide mist supply pipe used to the carbon dioxide mist pressure bath system depending on the invention.

The carbon dioxide mist exhausted from the exhaust mouth 36 of the carbon dioxide mist generating device 31 is supplied from the carbon dioxide mist supply pipe 37 to the pressure portion 81 and the living-body pressure bath cover 41. The carbon dioxide mist supply pipe 37 is furnished with liquid drop removing filter 37A for removing suppress liquid drops attached to the inside of the pipe. In addition, although not illustrating, the carbon dioxide mist supply pipe 37 is furnished inside with a check valve for checking back flow of the carbon dioxide mist. Further, as shown in FIG. 3, preferably, the carbon dioxide mist supply pipe 37 is overall or partially composed of a soft cornice shaped pipe 37B of a large diameter. If composing with such a corniced pipe 37B, the pipe 37B is freely bent and may be expanded so that the user is not restricted in action. Even if the carbon dioxide mist flowing in the carbon dioxide mist supply pipe 37 becomes gradually liquefied, the liquid can be removed through concaves and convexes of the cornice.

The liquid pressurizer 51 is composed of, for example, such as a pump. The liquid stored in the tank 32 of the carbon dioxide mist generating device 31 and sufficiently dissolved with carbon dioxide is supplied under pressure into the liquid 33 of the carbon dioxide mist generating device 31. Thereby, the inside of the tank 32 of the carbon dioxide mist generating device 31 is generated with the carbon dioxide mist of the high density of carbon dioxide, and the carbon dioxide mist stored in the tank 32 can be pushed out into the living-body pressure bath cover 41. The liquid pressurizer 51 is provided with a manometer 52.

The living-body pressure bath cover 41 may form a space for covering the skin and mucous membrane of the living body (herein, as the example, a lower extremities), and sealing the carbon dioxide mist and carbon dioxide inside. The living-body pressure bath cover 41 is suitably composed of a non-air permeable material, for example, preferably, the natural rubber, silicone rubber, polyethylene, polypropylene, polyvinylidene, polystylene, polyvinylacetate, polyvinyl chloride, polyamide resin, or polytetrafluoroethylene. The living-body pressure bath cover 41 has a supply port 43 for introducing the carbon dioxide mist and carbon dioxide inside. The supply port 43 is inside provided with a check valve for checking back flow of the carbon dioxide mist and carbon dioxide.

The living-body pressure bath cover 41 is inside installed with a manometer 101 for measuring an inside pressure. The control device 71 controls supply of the carbon dioxide mist and carbon dioxide on the basis of measuring values of the manometer 101 for maintaining a pressure value within the living-body pressure bath cover 41 to be more than 1 air pressure (more preferably, around 1.02 to 2.5 air pressure). Further, the living-body pressure bath cover 41 is inside installed with a thermometer 102 for measuring an inside temperature within the living-body pressure bath cover 41. The control device 71 performs on-off of a heater installed in the liquid supply means 21 on the basis of measuring values of the thermometer 102 for maintaining a predetermined temperature (for example, around 38° C.) bringing about warm bath effects within the living-body pressure bath cover 41.

The living-body pressure bath cover 41 has, around its opening, a stopper 42 for attaching to and detaching from the living body (herein, as the example, the lower extremities) and stopping leakage of the carbon dioxide mist and carbon dioxide. The stopper 42 is suitably composed of, e.g., a stretching face fastener, or may have a sole string or rubber or their combination. For heightening a sealing property in the living-body pressure bath cover 41, the inside (that of the stopper 42) may have a material attaching to the user's skin. The adhesive material is preferably a visco-elastic gel of polyurethane or silicone rubber. Further, this adhesive material is detachably used and exchangeable each time or if viscosity becomes weak.

The control device 71 is composed of a computer having CPU, memory and display. This performs various kinds of controls such as pressure or on-off switch of carbon dioxide from the carbon dioxide supply means 11; switch to the carbon dioxide mist generating device 31/the living-body pressure bath cover 41; temperature on-off switch of control of supply pressure or control of the liquid from the liquid supply means 21; on-off switch of supply of the carbon dioxide mist from the carbon dioxide mist generating device 31; on-off switch of the liquid exhaust part 35; switch of the valve 63; and on-off switch of the liquid pressurizer or the pressure portion 81 in order to perform the carbon dioxide mist pressure bath under an optimum condition.

The pressure portion 81 is a hollow gas storage furnished in communication with the living-body pressure bath cover 41 for pressurizing the inside of the living-body pressure bath cover 41. The pressure portion 81 is connected to the supply mouth 43 of the living-body cover pressure bath 41, and has a supply mouth 82 from which the carbon dioxide mist or carbon dioxide is supplied into the inside thereof. Further, the supply mouth 82 of the pressure portion 81 is also provided with the check valve for checking back flow of the carbon dioxide mist and carbon dioxide. After storing the carbon dioxide mist or carbon dioxide in the pressure portion 81, if pressurizing as crushing the pressure portion 81 as arrows shown, the carbon dioxide mist or carbon dioxide in the pressure portion 81 is exhausted into the living-body cover pressure bath 41, enabling to pressurize the living-body cover pressure bath 41.

By the way, the pressure portion 81 may have a structure to be pressurized manually, otherwise mechanically by controlling the control means 71 using a drive device. Since pressurization in the carbon dioxide mist pressure bath heightens the effects by pressurizing in pulsing at predetermined interval, the pressure portion 81 may be pressurized intermittently at fixed rhythm. As to the pressurizing interval at such a case, if synchronizing with pulsations, the effects are more heightened.

For performing the carbon dioxide pressure bath using the carbon dioxide mist pressure bath system of the present embodiment, the living-body cover pressure bath 41 is secured to the living body (herein, the hand) and sealed. The liquid is supplied from the first liquid supply means 21A to the carbon dioxide generating device 31 and is stored in the tank 32. Subsequently, the liquid is supplied from the liquid exhaust mouth 35 to the fluid nozzle 33 through the first liquid pipe 62A, the valve 63 and the third liquid pipe 62C, and pulverized and dissolved together with carbon dioxide supplied from the carbon dioxide supply means 11 in order to generate the carbon dioxide mist. Thus, by holding such a circulation condition that the liquid passes from the tank 32 and again returns to the same tank 32 through the liquid circulation path 62 and the fluid nozzle 33, the dissolved density of carbon dioxide of the liquid is heightened. Next, the liquid is supplied from the liquid exhaust mouth 35 to the liquid pressurizer 51 via the first liquid pipe 62A, the valve 63 and the second liquid pipe 62B. When the liquid is enough filled in the liquid pressurizer 51, supplying is stopped. The liquid is supplied under pressure to the fluid nozzle 33 from the liquid pressurizer 51 via the second liquid pipe 62B, the valve 63 and the third liquid pipe 62C in order to generate the carbon dioxide mist. The carbon dioxide mist generated at this time is exhausted from the carbon dioxide mist exhaust mouth 36 together with the carbon dioxide mist collected in the tank 32, and is supplied from the supply mouth 43 into the living-body pressure bath cover 41 through the pressure portion 81. The carbon dioxide mist or carbon dioxide in the pressure portion 81 is exhausted into the living-body cover pressure bath 41 by pressurizing as crushing the pressure portion 81.

The control device 71 performs various controls such that the living-body pressure bath cover 41 becomes an optimum pressurized and heated condition (around 1.02 to 2.5 air pressure and around 38° C.) in view of the measuring values of the manometer 101 and the thermometer 102. When the inside of the living-body pressure bath cover 41 is enough filled with the mist, only carbon dioxide is directly supplied into the living-body pressure bath cover 41. When the pressure value of the living-body pressure bath cover 41 becomes than the predetermined value, the control device stops supply of carbon dioxide of the carbon dioxide supply means 11.

The above mentioned explanation has been made with the example of the hand of the living-body, and the invention is applicable to various parts. Then, the optimum carbon dioxide mist pressure bath is performed using the living-body pressure bath cover 41 meeting aimed parts of the living-body.

Figure 4A:
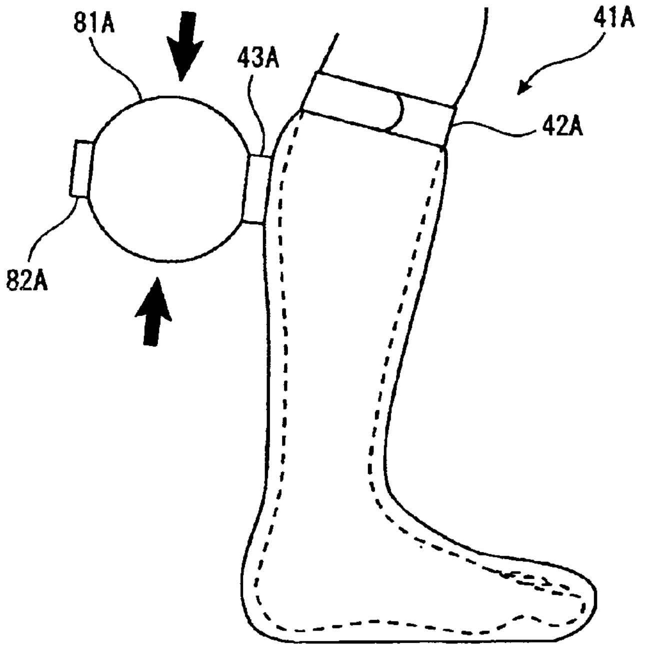
FIG. 4 A typical view showing configuration examples (No. 1) of the living-body cover of the carbon dioxide mist pressure bath system depending on the invention.
Figure 4B:
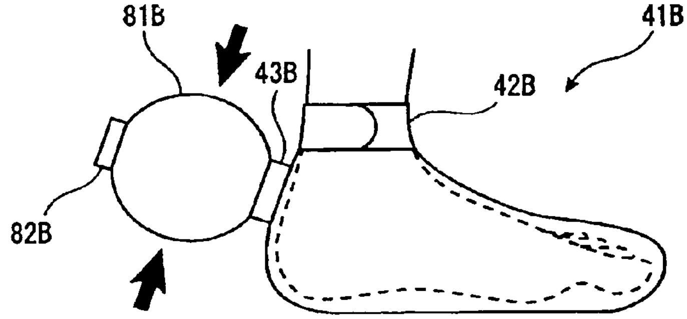
Figure 4C:
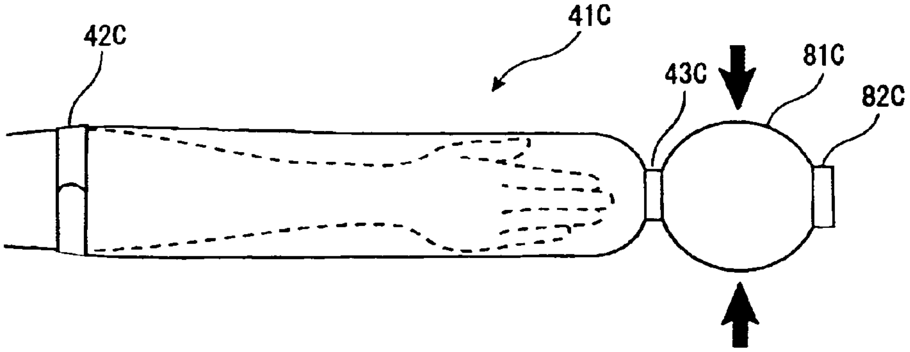
Figure 5A:
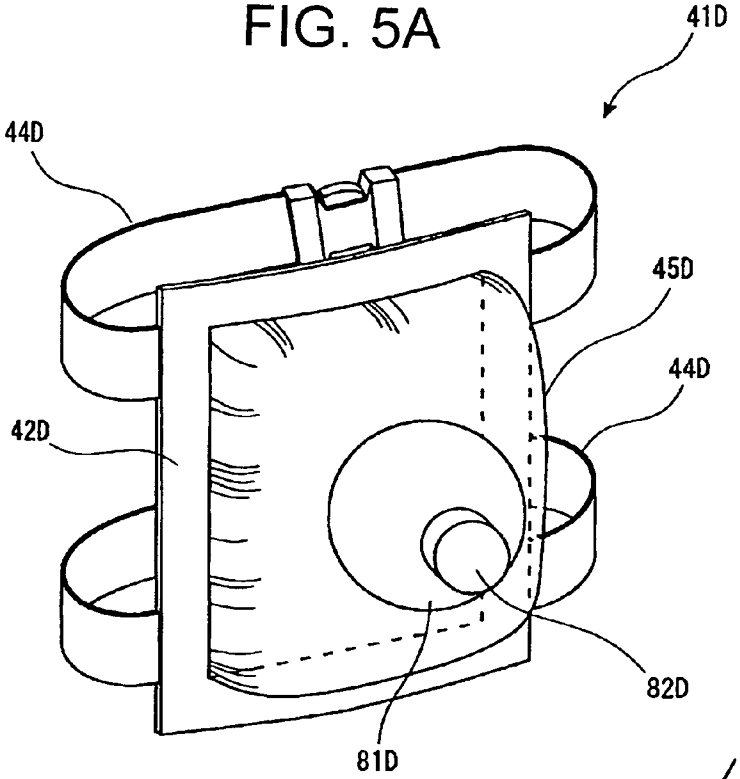
FIG. 5 A typical view showing configuration examples (No. 2) of the living-body cover of the carbon dioxide mist pressure bath system depending on the invention.
Figure 5B:
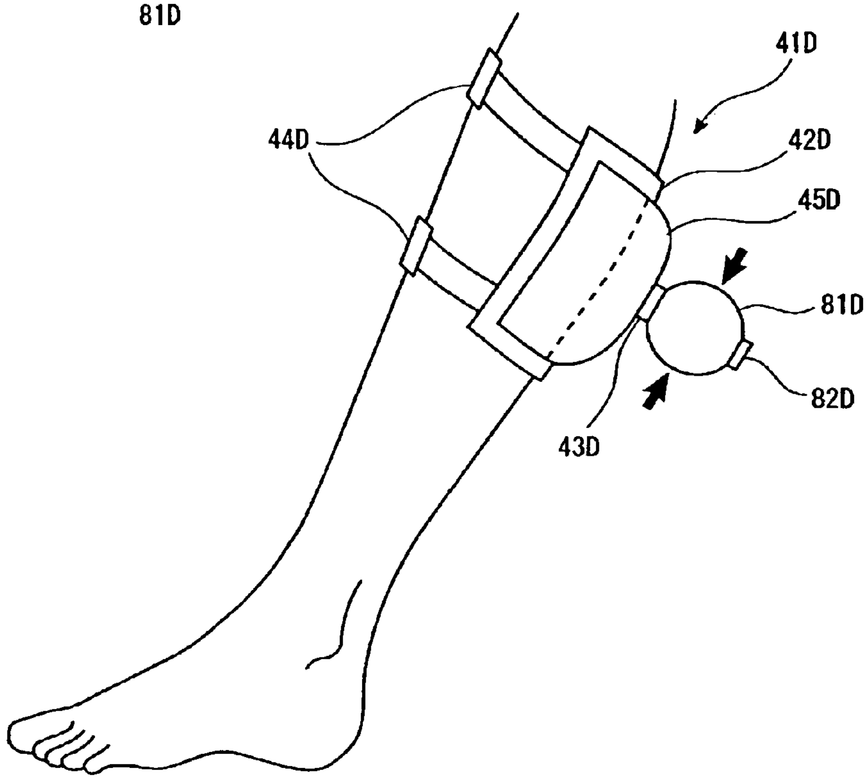

FIGS. 4 and 5 show the various shaped examples of the living-body pressure bath covers 41 for covering the further limited parts of the living body. At first, FIG. 4 shows the examples of the shapes of the living-body pressure bath cover 41 for covering limited parts of the living body (herein, the human body). FIG. 4(*a*) is a living-body pressure bath cover 41A for one-side lower extremity (lower part under a knee) of the living body. The living-body pressure bath cover 41A has a stopper 42A at its opening part and a supply mouth 43A for introducing the carbon dioxide mist and carbon dioxide inside thereof. The supply mouth 43A is connected with the pressurizing portion 81A, and is supplied with the carbon dioxide mist and carbon dioxide into the living-body pressure bath cover 41A through the supply mouth 82A of the pressurizing portion 81A. FIG. 4(*b*) is a living-body pressure bath cover 41B for a foot of the living-body. The living-body pressure bath cover 41B has a stopper 42B at its opening part and a supply mouth 43B for introducing the carbon dioxide mist and carbon dioxide inside. The supply mouth 43B is connected with the pressurizing portion 81B, and is supplied with the carbon dioxide mist and carbon dioxide into the living-body pressure bath cover 41B through the supply mouth 82B of the pressurizing portion 81B. FIG. 4(*c*) is a living-body pressure bath cover 41C for an arm of the living body. The living-body pressure bath cover 41C has a stopper 42C and a supply mouth 43C for introducing the carbon dioxide mist and carbon dioxide inside. The supply mouth 43C is connected with the pressurizing portion 81C, and is supplied with the carbon dioxide mist and carbon dioxide into the living-body pressure bath cover 41C through the supply mouth 82C of the pressurizing portion 81C. By the way, the living-body pressure bath cover may have such a shape for wrapping an upper half body or a lower half body.

Further, FIG. 5 shows a patch shaped living-body pressure bath covers 41D. FIG. 5(*a*) is a view showing an outline of the patch shaped living-body pressure bath covers 41D. FIG. 5(*b*) is a view showing an external appearance when attaching the patch shaped living-body pressure bath covers 41D to the living body (herein, lower extremity of the living body). The living-body pressure bath covers 41D is composed of a cover part 45D for covering the skin and mucous membrane of the living-body, a stopper 42D provided at the margin of the cover part 45D and directly attached to the skin and mucous membrane of the living-body, a supply mouth 43D for supplying the carbon dioxide mist and carbon dioxide into a space defined by the cover 45F and the stopper 42D, and fasteners 44D made of belts or strings for fastening the cover part 45D to the living body.

The supply mouth 43D is connected with the pressurizing portion 81D, and is supplied with the carbon dioxide mist and carbon dioxide into the living-body pressure bath cover 41D through the supply mouth 82D of the pressurizing portion 81D.

In regard to the living-body pressure bath covers 41, other than the examples shown in FIGS. 4 and 5, various shapes may be assumed. In sum, if forming spaces for sealing the carbon dioxide mist and carbon dioxide inside, any shapes are sufficient. An exhaust mouth may be formed for exhausting the gas and the mist from the inside of the living-body pressure bath covers 41. In addition, the invention may be applied not only to the human living body but to animals.

By the way, in the above embodiment, the pressurizing portion 81 is the hollow gas storage furnished in communication with the living-body pressure bath cover 41 for pressurizing the inside of the living-body pressure bath cover 41. As far as members pressurizing as crushing the living-body pressure bath cover 41 itself on the outer periphery, and enabling to easily pressure the living-body pressure bath cover 41, any members are employed.

Second Embodiment

Figure 6:
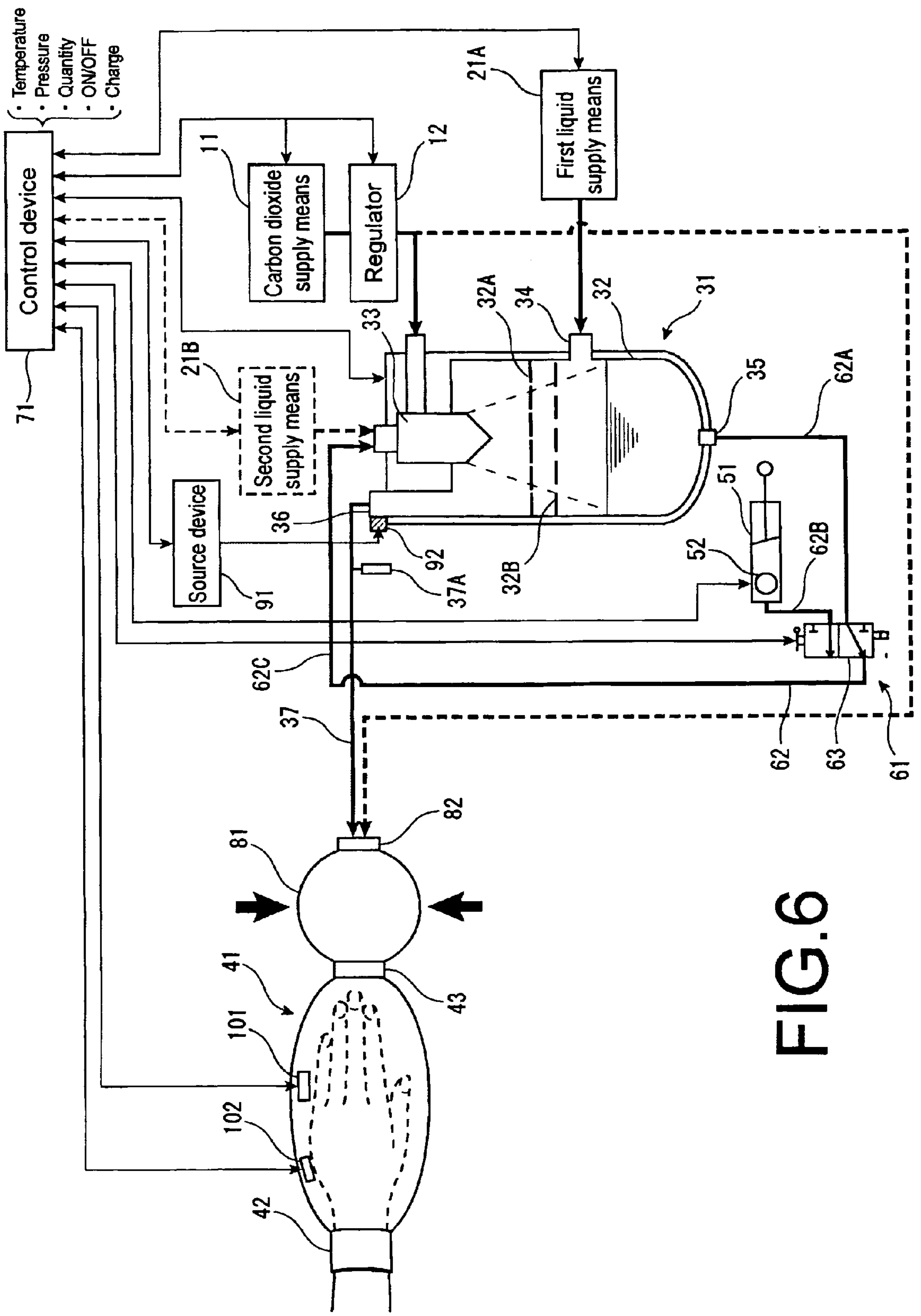
FIG. 6 A generally schematic view of the carbon dioxide mist pressure bath system depending on a second embodiment of the invention.

FIG. 6 is the whole schematic view of the carbon dioxide mist pressure bath system depending on the second embodiment of this invention. This embodiment will explain the carbon dioxide mist pressure bath system further having a means for electrically charging the generated mist. As to the same parts as those of the first embodiment shown in FIG. 1, the same numerals will be given, and detailed explanation will be omitted.

As shown in FIG. 6, the carbon dioxide mist pressure bath system of this invention is arranged with an electrode 92 at the carbon dioxide mist exhaust mouth 36 of the carbon dioxide mist generating device 31. The electrode 92 is connected to a source device 91, and the control device 71 sets voltage values and performs on-off switch control.

The electrode 92 supplies charge (minus charge is desirable) when exhausting the mist generated by the carbon dioxide mist generating device 31 from the carbon dioxide mist exhausting mouth 36. Thereby, the mist turns out a charged condition so that adhesion to a charged material can be heightened. For example, if enabling to increase adhesion to the skin and the mucous membrane of the living body, an effect of increasing absorption of the carbon dioxide by the mist is further heightened, and if the mist contains the above mentioned medicines, penetration into the skin and the mucous membrane can be accelerated.

For carrying out the carbon dioxide mist pressure bath using the carbon dioxide mist pressure bath system of the present embodiment, the living-body pressure bath cover 41 is secured to the living body (herein, as the example, the lower extremities) and sealed. The liquid is supplied from the first liquid supply means 21A to the carbon dioxide generating device 31 and is stored in the tank 32. Subsequently, the liquid is supplied from the liquid exhaust mouth 35 to the fluid nozzle 33 through the first liquid pipe 62A, the valve 63 and the third liquid pipe 62C, and pulverized and dissolved together with carbon dioxide supplied from the carbon dioxide supply means 11 in order to generate the carbon dioxide mist.

Thus, by holding for a fixed time such a circulation condition that the liquid passes from the tank 32 and again returns to the same tank 32 through the liquid circulation path 62 and the fluid nozzle 33, the dissolved density of carbon dioxide of the liquid is heightened. Next, the liquid is supplied from the liquid exhaust mouth 35 to the liquid pressurizer 51 via the first liquid pipe 62A, the valve 63 and the second liquid pipe 62B. When the liquid is enough filled in the liquid pressurizer 51, supplying is stopped. The liquid is supplied under pressure to the fluid nozzle 33 from the liquid pressurizer 51 via the second liquid pipe 62B, the valve 63 and the third liquid pipe 62C in order to generate the carbon dioxide mist. The carbon dioxide mist generated at this time is exhausted from the carbon dioxide mist exhaust mouth 36 together with the carbon dioxide mist collected in the tank 32. The control device 71 turns on the source device 91 and supplies the charge to the mist exhausted from the carbon dioxide mist exhaust 36, and the carbon dioxide mist is supplied from the supply mouth 43 into the living-body pressure bath cover 41. The carbon dioxide mist or carbon dioxide in the pressure portion 81 is exhausted into the living-body cover pressure bath 41 by pressurizing as crushing the pressure portion 81.

The control device 71 performs various controls such that the living-body pressure bath cover 41 becomes an optimum pressurized and heated condition (around 1.02 to 2.5 air pressure and around 38° C.) in view of the measuring values of the manometer 101 and the thermometer 102. When the inside of the living-body pressure bath cover 41 is enough filled, only carbon dioxide is directly supplied into the living-body pressure bath cover 41. When the pressure value of the living-body pressure bath cover 41 becomes than the predetermined value, the control device stops supply of carbon dioxide of the carbon dioxide supply means 11.

With the above mentioned structure, according to the carbon dioxide mist pressure bath system of the present invention, it is possible to heighten the density of carbon dioxide contained in the carbon dioxide mist, and accelerate efficiently the skin-pass absorption of carbon dioxide into the living body.

The above explanation has been made to the embodiments of the invention, but the invention is not limited to such embodiments, and so far as not deviating from the subject matter of the invention, various kinds of embodiments are, of course, available.

INDUSTRIAL APPLICABILITY

Thus, the present invention relates a gas mist pressure bath system, in which a carbon dioxide mist is contacted to a skin and mucous membrane of a human living-body at pressure of not less than a predetermined value, whereby carbon dioxide is absorbed into the skin and mucous membrane at high efficiency, and has an industrial applicability.

DESCRIPTION OF SYMBOLS

11: Carbon dioxide supply means
12: Regulator
21: Liquid supply means
21A: First liquid supply means
21B: Second liquid supply means
31: Carbon dioxide mist generating device
32: Tank
32A: Plate
32B: Plate
33: Fluid nozzle
34: Liquid supply mouth
35: Liquid exhaust mouth
36: Carbon dioxide mist exhaust mouth
37: Carbon dioxide mist supply mouth
37A: Liquid drop removing filter
37B: Cornice shaped pipe
41, 41A, 41B, 41C, 41D: Living-body pressure bath cover
42, 42A, 42B, 42C, 42D: Stopper
43, 43A, 43B, 43C, 43D: Supply mouth
44D: Fastener
45D: Cover
51: Liquid pressurizer
52: Manometer
61: Liquid circulation means
62: Liquid circulating path
62A: First liquid pipe
62B: Second liquid pipe
62C: Third liquid pipe
63: Valve
71: Control device
81, 81A, 81B, 81C, 81D: Pressurizing portion
82, 82A, 82B, 820, 82D: Supply mouth
91: Source device
92: Electrode
101: Manometer, and
102: Thermometer

The invention claimed is:

1. A carbon dioxide mist pressure bath system for contacting a carbon dioxide mist to a skin and mucous membrane of a living-body, the carbon dioxide mist being prepared by pulverizing and dissolving carbon dioxide and a liquid comprising:

a carbon dioxide supply device for supplying the carbon dioxide;

a liquid supply device for supplying the liquid;

a carbon dioxide mist generating device for generating the carbon dioxide mist by pulverizing and dissolving the carbon dioxide and the liquid, the carbon dioxide mist generating device including a tank connected to the liquid supply device, a nozzle disposed in the tank and connected to the carbon dioxide supply device, and a liquid exhaust portion for exhausting the liquid from the tank;

a living-body cover member for covering the skin and mucous membrane of the living-body, the living-body cover member being formed with a space for sealing the carbon dioxide mist generated by the carbon dioxide mist generating device and supplied thereto;

a liquid circulation device having a liquid circulation path, the liquid stored in the tank being circulated from the liquid exhaust portion to the nozzle through the liquid circulation path such that an amount of the carbon dioxide dissolved in the liquid is increased through circulation thereof; and a pressurization device for pressurizing an inside of the living-body cover member, the carbon dioxide mist generating device being connected to the living-body cover member through the pressurization device, wherein the carbon dioxide mist in the living body cover member contacts the skin and mucous membrane of the living-body.

2. A carbon dioxide mist pressure bath system as set forth in claim 1, further comprising a liquid pressurizing device for supplying and pressurizing the liquid circulating through the liquid circulation device.

3. A carbon dioxide mist pressure bath system as set forth in claim 1, wherein the tank has at least one plate having pores therein for refining the carbon dioxide mist.

4. A carbon dioxide mist pressure bath system as set forth in claim 1, further comprising a liquid pressurizer for pressurizing the liquid to supply a pressurized liquid to the nozzle, the liquid pressurizer being connected to the liquid circulation device, wherein the carbon dioxide mist generating device has a carbon dioxide mist exhaust portion at a top surface thereof; and the carbon dioxide mist generated with the pressurized liquid from the liquid pressurizer is exhausted from the carbon dioxide mist exhaust portion together with the carbon dioxide mist stored in the tank.

5. A carbon dioxide mist pressure bath system as set forth in claim 4, wherein the liquid circulation path is formed of a first liquid pipe and a second liquid pipe, the first liquid pipe extending from the liquid exhaust portion to the nozzle, and the second liquid pipe connecting the liquid circulation device and the liquid pressurizer.

6. A carbon dioxide mist pressure bath system as set forth in claim 5, wherein the liquid circulation device further includes a switching valve for switching a first path connecting the liquid exhaust portion and the nozzle, a second path connecting the liquid exhaust portion and the liquid pressurizer, and a third path connecting the liquid pressurizer and the nozzle.

7. A gas mist pressure bath system as set forth in claim 6, wherein the tank includes an upper plate and a lower plate apart from each other, each plate having pores for refining the carbon dioxide mist; and a diameter of the pore of the upper plate is smaller than that of the lower plate, and the pores of the upper plate are placed out of alignment with those of the lower plate.

8. A carbon dioxide mist pressure bath system as set forth in claim 7, further comprising a sensor for measuring conditions including a supply, pressure and temperature of the carbon dioxide, the liquid and the carbon dioxide mist, and a control device for controlling the conditions of the carbon dioxide and the liquid, and the carbon dioxide mist, based on measuring values of the sensor.

9. A carbon dioxide mist pressure bath system as set forth in claim 8, wherein the control device holds pressure at 1.02 to 2.5 atmospheric pressure in the living-body cover member when taking the carbon dioxide mist bath.

10. A carbon dioxide mist pressure bath system as set forth in claim 8, wherein supply of carbon dioxide from the carbon dioxide supply device is stopped when an atmospheric pressure value within the living-body cover member is higher than a predetermined value.

11. A carbon dioxide mist pressure bath system as set forth in claim 7, wherein the pressurization device for pressurizing the living-body cover member carries out an interval pressurization.

12. A carbon dioxide mist pressure bath system as set forth in claim 7, further comprising an electric charge supply device for supplying an electric charge to the mist from the carbon dioxide mist generating device, the electric charge supply device being arranged around the carbon dioxide mist exhaust portion.

13. A carbon dioxide mist pressure bath system as set forth in claim 12, wherein the charge is a negative charge.

14. A carbon dioxide mist pressure bath system as set forth in claim 13, wherein the liquid supply device has a heater, and the liquid is heated and supplied into the carbon dioxide mist generating device.

15. A carbon dioxide mist pressure bath system as set forth in claim 7, wherein the carbon dioxide mist includes small droplets of the liquid and sizes of the small droplets of the carbon dioxide mist supplied from the carbon dioxide mist generating device to the living-body cover member are suitably not more than 10 μm.

16. A carbon dioxide mist pressure bath system as set forth in claim 7, wherein the carbon dioxide mist generating device has a mist supply pipe for supplying the carbon dioxide mist into the living-body cover member, and the mist supply pipe has a filter for removing liquid drops attached to an inside thereof.

17. A carbon dioxide mist pressure bath system as set forth in claim 7, wherein the carbon dioxide mist generating device has a mist supply pipe for supplying the carbon dioxide mist into the pressurization device, and at least one part of the mist supply pipe is shaped in a cornice.

18. A carbon dioxide mist pressure bath system as set forth in claim 7, wherein the carbon dioxide mist generating device has a mist supply pipe for supplying the carbon dioxide mist into the living-body cover member, and the mist supply pipe is provided with a check valve.

19. A carbon dioxide mist pressure bath system as set forth in claim 7, wherein the living-body cover member and the pressurization device respectively have a supply mouth of the carbon dioxide mist, and each supply mouth is provided with a check valve.

* * * * *